(12) United States Patent
Miyaake et al.

(10) Patent No.: US 10,508,211 B2
(45) Date of Patent: Dec. 17, 2019

(54) INK, INK CONTAINER, RECORDING DEVICE, RECORDING SET AND RECORDING METHOD

(71) Applicants: Azumi Miyaake, Kanagawa (JP); Kaori Miyahara, Shizuoka (JP); Masayuki Koyano, Kanagawa (JP); Mio Kumai, Tokyo (JP); Ayano Momose, Tokyo (JP); Satoshi Kojima, Kanagawa (JP); Kiminori Masuda, Tokyo (JP); Amika Sagara, Tokyo (JP); Hiroki Hagiwara, Tokyo (JP)

(72) Inventors: Azumi Miyaake, Kanagawa (JP); Kaori Miyahara, Shizuoka (JP); Masayuki Koyano, Kanagawa (JP); Mio Kumai, Tokyo (JP); Ayano Momose, Tokyo (JP); Satoshi Kojima, Kanagawa (JP); Kiminori Masuda, Tokyo (JP); Amika Sagara, Tokyo (JP); Hiroki Hagiwara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/131,914

(22) Filed: Sep. 14, 2018

(65) Prior Publication Data
US 2019/0100667 A1   Apr. 4, 2019

(30) Foreign Application Priority Data

Sep. 29, 2017 (JP) .................................. 2017-190542
Jun. 28, 2018 (JP) .................................. 2018-122912

(51) Int. Cl.
C09D 11/40 (2014.01)
C09D 11/322 (2014.01)
(Continued)

(52) U.S. Cl.
CPC .............. C09D 11/40 (2013.01); B41J 2/175 (2013.01); B41M 5/0023 (2013.01);
(Continued)

(58) Field of Classification Search
CPC ....... C09D 11/40; C09D 11/322; C09D 11/38; C09D 11/033; C09D 11/037
(Continued)

(56) References Cited

U.S. PATENT DOCUMENTS 7,284,851 B2   10/2007  Bannai et al.
9,085,706 B2 *  7/2015  Gotou ................. C09D 11/322
(Continued)

FOREIGN PATENT DOCUMENTS

JP   2000-290548   10/2000
JP   2008-016412   1/2006
(Continued)

Primary Examiner — An H Do
(74) Attorney, Agent, or Firm — Oblon, McClelland, Maier & Neustadt, L.L.P.

(57) ABSTRACT

An ink includes water, a coloring material, an organic solvent having a solubility parameter of from 8.0 to 13.0, an urethane resin particle and a metal ion, wherein the organic solvent having the solubility parameter of from 8.0 to 13.0 has a proportion of from 10.0% by mass to 30.0% by mass to the ink, where the metal ion is at least one selected from an alkali metal ion and an alkaline earth metal ion, where the metal ion has a proportion of from 4000 mg/L to 8000 mg/L to the ink.

11 Claims, 1 Drawing Sheet

(51) Int. Cl.

| | |
|---|---|
| *C09D 11/38* | (2014.01) |
| *C09D 11/033* | (2014.01) |
| *C09D 11/037* | (2014.01) |
| *B41J 2/175* | (2006.01) |
| *C08G 18/44* | (2006.01) |
| *C08G 18/75* | (2006.01) |
| *C08G 18/24* | (2006.01) |
| *B41M 5/00* | (2006.01) |
| *B41M 5/50* | (2006.01) |
| *C09D 11/102* | (2014.01) |

(52) U.S. Cl.
CPC ........... *B41M 5/502* (2013.01); *C08G 18/244* (2013.01); *C08G 18/44* (2013.01); *C08G 18/755* (2013.01); *C09D 11/033* (2013.01); *C09D 11/037* (2013.01); *C09D 11/102* (2013.01); *C09D 11/322* (2013.01); *C09D 11/38* (2013.01)

(58) Field of Classification Search
USPC ................. 347/95, 100; 106/31.13, 31.51
See application file for complete search history.

(56) References Cited

U.S. PATENT DOCUMENTS

| 10,016,981 B2* | 7/2018 | Hama ................ C09D 11/037 |
|---|---|---|
| 2017/0260405 A1 | 9/2017 | Kumi et al. |

FOREIGN PATENT DOCUMENTS

| JP | 2016-175851 | 10/2016 |
|---|---|---|
| JP | 2016-216619 | 12/2016 |

\* cited by examiner

INK, INK CONTAINER, RECORDING DEVICE, RECORDING SET AND RECORDING METHOD

CROSS-REFERENCE TO RELATED APPLICATIONS

This patent application is based on and claims priority pursuant to 35 U.S.C. § 119(a) to Japanese Patent Application Nos. 2017-190542 and 2018-122912, filed on Sep. 29, 2017 and Jun. 28, 2018, respectively, in the Japan Patent Office, the entire contents of which are incorporated herein by reference.

BACKGROUND

Technical Field

The present disclosure relates to an ink, an ink container, a recording device, a recording set and a recording method.

Description of the Related Art

A water-based ink including a coloring material is known as an ink used in an inkjet recording method. When such ink is used for a permeable recording medium such as paper, it is difficult to raise image density because the ink is easily permeated.

SUMMARY

According to the present invention, provided is an improved ink including water, a coloring material, an organic solvent having a solubility parameter of from 8.0 to 13.0, an urethane resin particle and a metal ion, wherein the organic solvent having the solubility parameter of from 8.0 to 13.0 has a proportion of from 10.0% by mass to 30.0% by mass to the ink, wherein the metal ion is at least one selected from a group consisting of an alkali metal ion and an alkaline earth metal ion, wherein the metal ion has a proportion of from 4000 mg/L to 8000 mg/L to the ink.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

Figure 1:
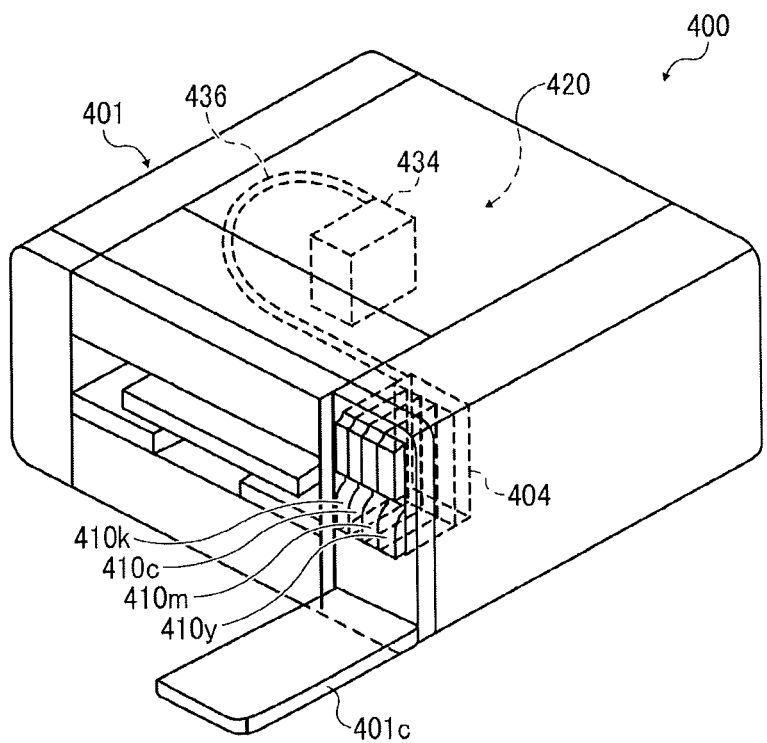
FIG. 1 is a perspective view illustrating a diagram of an example of the recording device.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Objects of the present disclosure are to improve image density and abrasion resistance of an image formed with an ink and to improve storage stability of the ink.

Ink

Conventionally, means for selecting a coloring material is known to improve image density of an image formed with an ink. However, it is difficult to select the coloring material that can improve image density without lowering abrasion resistance of the image. In addition, means of using an ink which tends to increase viscosity by evaporation of water included in the ink is known to improve image density. When viscosity of the ink increases, a coloring material remains on a surface of a recording medium, and image density is improved. However, this means is inferior in storage stability of the ink. This is because evaporation of water in the ink during storage causes viscosity increase.

The present disclosure is an ink that can solve these problems. The ink of the present disclosure includes an organic solvent, water, a coloring material, a resin, an additive.

Organic Solvent

There is no specific limitation on the type of the organic solvent. For example, water-soluble organic solvents are usable. Examples of water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether, polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250° C. or less are preferable since they can function as a wetting agent while providing good drying property.

In addition, polyol compounds having 8 or more carbon atoms and glycol ether compounds are also preferable. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In particular, the polyol compounds having 8 or more carbon atoms and the glycol ether compounds, exemplified above, are capable of improving paper-permeability of the ink, which is advantageous when the ink is printed on a recording medium made of paper.

Preferably, the content rate of the organic solvent in the ink is in the range of from 10% to 60% by mass, more preferably from 20% to 60% by mass, for drying property and discharge reliability of the ink.

Organic Solvent Having Solubility Parameter of from 8.0 to 13.0

The ink of the present disclosure includes the organic solvent having a solubility parameter of from 8.0 to 13.0. The solubility parameter (hereinafter referred to as "SP value") means a dissolution parameter and is used in general as an index for affinity and solubility of materials dissolved or dispersed in water or a solvent for use. The SP value can be obtained by various ways such as measuring by experiments, calculating by measuring physical property, such as immersion heat, or calculating from molecular structures. In the present disclosure, the SP value is obtained by the calculation method based on the molecule structure proposed by Fedors. This method has advantages, where the SP value can be calculated if a molecule structure is known and the difference between the SP value obtained from this method and the measuring value based on experiments is small. In the Method of Fedors, the evaporation energy $\Delta e_i$ and the mol volume $\Delta v_i$ of each atom and atom group at degrees C. are defined as in the following Table 1 and the values are assigned to the following relation A to obtain the SP value. In the present disclosure, according to the Method of Fedors, the SP value calculated from the molecular structure is used and represented in $(cal/cm^3)R^{1/2}$. Also, in the present disclosure, the SP value at 25 degrees C. is used and not subject to temperature conversion, etc.

$$SP\ value = \left(\frac{\Delta E}{V}\right)^{1/2} = \left(\frac{\sum_i \Delta \theta i}{\sum_i \Delta V i}\right)^{1/2} \quad (A)$$

In the relation A, $\Delta E$ represents agglomeration energy density, V represents mol volume, $\Delta e_i$ represents the evaporation energy of atom or atom group, and $\Delta v_i$ represents mol volume of atom or atom group. For example, the SP value of isopropylidene glycerol (iPDG) is calculated from the values shown in Table 1 as follows.

$$SP\ value = (14610/151)^{1/2} = 9.8 (cal/cm^3)^{1/2}$$

TABLE 1

| Atom group | $\Delta e_i$ (cal/mol) | $\Delta v_i$ (cm³/mol) | iPDG Number of Atom groups | Sum of $\Delta e_i$ (cal/mol) | Sum of $\Delta v_i$ (cm³/mol) |
| --- | --- | --- | --- | --- | --- |
| —CH₃— | 1125 | 33.5 | 2 | 2250 | 67.0 |
| —CH₂— | 1180 | 16.1 | 4 | 4720 | 64.4 |
| —CH— | 820 | −1.0 | 1 | 820 | −1.0 |
| —O— | 800 | 3.8 | 2 | 1600 | 7.6 |
| —OH (adjacent to C atom) | 5220 | 13.0 | 1 | 5220 | 13.0 |
| | | | Total | 14610 | 151.0 |

SP value is calculated by Fedors method (R. F. Fedors: Polym. Eng. Sci., 14[2], 147-154 (1974). Specific examples of the solvents are shown in Table 2 with a boiling point and an SP value for each thereof.

TABLE 2

| | Solvent | Boiling Point (° C.) | SP Value (Calculated Value) |
| --- | --- | --- | --- |
| Amines | N-methyl-2-pyrroridone | 202 | 10.1 |
| | 1,3-dimethyl-2-imidazolidinone | 220 | 10.1 |
| | 2-pyrroridone | 245 | 11.2 |
| Glycolethers | Ethyleneglycol monopropyl ether | 150 | 10.2 |
| | Diethyleneglycol dimethyl ether | 162 | 8.1 |
| | Ethyleneglycol mono-n-butyl ether | 171 | 10.0 |
| | 3-methoxy-3-methyl-1-butanol | 174 | 9.6 |
| | Diethyleneglycol ethyl methyl ether | 176 | 8.1 |
| | Dipropyleneglycol monomethyl ether | 188 | 9.7 |
| | Diethyleneglycol diethyl ether | 189 | 8.2 |
| | Diethyleneglycol monomethyl ether | 194 | 10.3 |
| | Diethyleneglycol monovinyl ether | 196 | 10.9 |
| | Diethyleneglycol ethyl ether | 202 | 10.1 |
| | Triethyleneglycol dimethyl ether | 216 | 8.4 |
| | Diethyleneglycol monobutyl ether | 230 | 9.9 |
| | Tripropyleneglycol monomethyl ether | 241 | 9.4 |
| | Triethyleneglycol monomethyl ether | 249 | 10.1 |
| | 2,3-butanediol | 183 | 12.5 |
| | 1,2-propanediol | 187 | 13.5 |
| | 1,2-butanediol | 194 | 12.8 |
| | 2-methyl-2,4-pentanediol | 198 | 11.5 |
| | 2,4-pentanediol | 201 | 12.0 |
| | 1,3-butandiol | 203 | 12.8 |
| | 3-methyl-1,3-butanediol | 203 | 12.1 |
| | 2-methyl-1,3-propanediol | 213 | 12.8 |
| | 2-ethyl-1,3-hexanediol | 244 | 9.9 |
| | 1,3-propanediol | 214 | 13.7 |
| | 1,2-hexanediol | 223 | 11.8 |
| | 1,4-butanediol | 230 | 12.9 |
| | Diethyleneglycol | 245 | 13.0 |
| | Dipropyleneglycol | 245 | 9.5 |

As the organic solvent having the SP value of from 8.0 to 13.0, organic solvents whose "SP Value (Calculated Value)" is in the range of from 8.0 to 13.0 listed in Table 2 can be used. Preferred examples of the organic solvent having the SP value of from 8.0 to 13.0 include triethyleneglycol monomethyl ether, triethyleneglycol dimethyl ether, 1,2-hexanediol, 1,3-butandiol, 2-ethyl-1,3-hexanediol, and 2-pyrroridone.

The use of the organic solvent having the SP value of from 8.0 to 13.0 and having the SP value far from that of water suppresses the aggregation of coloring materials while preserving the ink and promotes aggregation rapidly after the ink is applied to an absorptive recording medium. When such ink is used, the stability during storage of the ink is high, and clogging in a head is suppressed. After the ink is applied to the absorptive recording medium, the coloring material is agglutinated and remains on a surface of the medium to improve image density. In addition, it is difficult for an organic solvent having the SP value of less than 8.0 to improve storage stability of the ink. It is difficult for an organic solvent having the SP value of more than 13.0 to promote aggregation of the coloring material after the ink is applied to the absorptive recording medium and to improve image density sufficiently.

The organic solvent having the SP value of from 8.0 to 13.0 has a proportion of from 10.0% by mass to 30.0% by mass to the ink, preferably from 12.0% by mass to 26.0% by mass, more preferably from 14.0% by mass to 26.0% by mass. It is difficult for the organic solvent having the SP value of from 8.0 to 13.0 having the proportion of less than 10.0% by mass to the ink to promote aggregation of the coloring material after the ink is applied to the absorptive recording medium and to improve image density sufficiently. The organic solvent having the SP value of from 8.0 to 13.0 having the proportion of more than 30.0% by mass to the ink decreases storage stability of the ink. Two or more of these organic solvents having the SP value of from 8.0 to 13.0 can be used alone or in combination with others. If two or more of these organic solvents having the SP value of from 8.0 to 13.0 are used in combination with others, total organic solvents having the SP value of from 8.0 to 13.0 have a proportion of from 10.0% by mass to 30.0% by mass to the ink.

For example, presence of the organic solvent having the SP value of from 8.0 to 13.0 and the proportion of the organic solvent having the SP value of from 8.0 to 13.0 to the ink can be measured by reactive pyrolysis gas chromatographic mass spectrometry (GC/MS). A liquid after removal of the pigment, etc. in the ink by centrifugation is measured, for example, under the following analysis conditions. The proportion is measured by preparing a calibration curve of a material to be quantified under the same analysis conditions as the ink.

Analysis Conditions
Column: DB-35MS, L=60 m, ID=0.25 mm, Film=0.25 µm
Column temperature raising: from 50° C. to 250° C. (maintained at 50° C. for 1 minute, raised at 10° C./min and maintained at 250° C. for 5 minutes)
Column flow rate: 1.0 mL/min
Ionization method: EI method (70 eV)
Mass range: m/z, 18-700
Injection mode: Split (1:50)
Water
Preferably, the content rate of water in the ink is in the range of from 10% to 90% by mass, more preferably from 20% to 60% by mass, for drying property and discharge reliability of the ink.

Coloring Material
Examples of the coloring material include, but are not limited to, inorganic pigments and organic pigments. Two or more of the coloring materials can be used alone or in combination with others. Mixed crystals can also be used as the coloring material.

Examples of the pigments include black pigments, yellow pigments, magenta pigments, white pigments, green pigments, orange pigments, glossy color pigments (e.g., gold pigments, silver pigments), and metallic pigments.

Specific examples of the inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method.

Specific examples of the organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for the solvent are preferable. In addition, resin hollow particles and inorganic hollow particles can also be used.

Specific examples of the pigments usable for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of the pigments usable for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153.155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3, 15:4 (phthalocyanine blue), 16, 17:1, 56, 60, and 63; and C.I. Pigment Green 1, 4, 7, 8, 10, 17, 18, and 36.

Preferably, the content rate of the coloring material in the ink is in the range of from 0.1% to 15% by mass, more preferably from 1% to 10% by mass, for improving image density, fixing strength, and discharge stability.

The coloring material can be dispersed in the ink by any of the following methods: introducing a hydrophilic functional group to the pigment to make the pigment self-dispersible; covering the surface of the pigment with a resin; and dispersing the pigment by a dispersant.

In the method of introducing a
hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. In this case, the pigment may be referred to as a resin-covered pigment. In this case, not all the pigment particles included in the ink should be covered with a resin. It is possible that a part of the pigment particles are not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

For example, a nonionic surfactant RT-100 (product of Takemoto Oil & Fat Co., Ltd.) and sodium naphthalenesulfonate formalin condensate are preferably used as the dispersant.

One dispersant can be used alone, and two or more dispersants can be used in combination.

Metal Ion

The ink of the present disclosure includes the metal ion that is at least one selected from a group consisting of an alkali metal ion and an alkaline earth metal ion. Preferably, the ink includes the metal ion that is at least one selected from a group consisting of a sodium ion, a calcium ion and a potassium ion, more preferably the ink includes the sodium ion. One kind of the metal ion can be used alone, and two or more kinds of the metal ion can be used in combination.

The metal ion has a proportion of from 4000 mg/L to 8000 mg/L to the ink. It is difficult for the metal ion having the proportion of less than 4000 mg/L to the ink to promote aggregation of the coloring material after the ink is applied to the absorptive recording medium and to improve image density sufficiently. The metal ion having the proportion of more than 8000 mg/L to the ink decreases storage stability of the ink. In addition, parts forming an inkjet head have good liquid resistance to the ink including the metal ion having the proportion of from 4000 mg/L to 8000 mg/L to the ink.

Preferably, the sodium ion has the proportion of from 3000 mg/L to 8000 mg/L to the ink. The sodium ion has higher agglutination effect than the calcium ion and the potassium ion. The sodium ion reduces ejection stability to the same extent as the calcium ion and the potassium ion. Thus, it is preferable that the ratio of the content of the sodium ion to the content of the metal ion is large. In addition, when the sodium ion has the proportion of 3000 mg/L or more and less than 4000 mg/L to the ink, the proportion of the metal ion including the sodium ion, the calcium ion and the potassium ion is 4000 mg/L to 8000 mg/L to the ink. Preferably, the metal ion is used as a counter ion of a functional group of a self-dispersible pigment, a functional group of a resin of a resin-coated pigment and a functional group of a dispersant, more preferably the metal ion is used as the counter ion of the functional group of the self-dispersible pigment.

Pigment Dispersion

The ink can be obtained by mixing the pigment with other materials such as water and the organic solvent. The ink can also be obtained by, first, preparing a pigment dispersion by mixing the pigment with water, a pigment dispersant, etc., and thereafter mixing the pigment dispersion with other materials such as water and the organic solvent.

The pigment dispersion can be obtained by mixing water, the pigment, a pigment dispersant, and other components, if any. The pigment is dispersed in the pigment dispersion with the adjusted particle diameter. Preferably, the pigment dispersion is prepared with a disperser.

Preferably, the pigment dispersed in the pigment dispersion has a maximum frequency particle diameter in the range of from 20 to 500 nm, more preferably from 20 to 150 nm, based on the number of pigment particles, for improving dispersion stability of the pigment and discharge stability and image quality (e.g., image density) of the ink. The particle diameter of the pigment can be measured with a particle size distribution analyzer (NANOTRAC WAVE-UT151 available from MicrotracBEL Corp.).

Preferably, the content rate of the pigment in the pigment dispersion is in the range of from 0.1% to 50% by mass, more preferably from 0.1% to 30% by mass, for improving discharge stability and image density.

Preferably, the pigment dispersion may be subjected to filtration using a filter or a centrifugal separator to remove coarse particles, and thereafter to degassing.

Resin

The resin included in the ink is a urethane resin. Examples of the urethane resin include, but are not limited to, a polycarbonate urethane resin and a polyester urethane resin. Preferably, the urethane resin includes the polycarbonate urethane resin. In the present disclosure, the urethane resin is used as a resin particle. It is possible to mix a resin emulsion in which the resin particles are dispersed in water serving as a dispersion medium with materials such as the coloring material and the organic solvent to obtain the ink. The resin particle can be synthesized or is available on the market. These can be used alone or in combination of the resin particles. The urethane resin has a functional group such as —COOH in a certain proportion of structure units in order to disperse in water. The functional group prevents extreme aggregation of the pigment and plays a role of connecting pigments to each other, so that abrasion resistance is improved.

In addition, the presence of the urethane resin in the ink can be measured by FT-IR, NMR, GC/MS. Regarding FT-IR, for example, FT-IR spectrometer (Spectrum One from PerkinElmer Co., Ltd.) can be used under the condition of scan number: 16, resolution capability: 2 $cm^{-1}$, and mid-infrared region: 400 $cm^{-1}$ to 4000 $cm^{-1}$, respectively.

Examples of a method for dispersing the urethane resin particles in an aqueous medium include a forced emulsification method using a dispersant and a self-emulsification method using the urethane resin in which an anionic group is contained. The forced emulsification method may reduce a coating film strength because the dispersant may remain in the coating film. Therefore, use of the self-emulsification method is preferable.

Examples of the anionic group include a carboxyl group, a carboxylate group, a sulfonic acid group, and a sulfonate group. Among these anionic groups, a carboxylate group or sulfonate group partially or wholly or particularly preferably wholly neutralized with, for example, a basic compound are preferable.

Incorporation of the anionic group can be achieved with use of a polyol containing an anionic group. Examples of the polyol containing an anionic group include 2,2-dimethylolpropionic acid, 2,2-dimethylolbutanoic acid, 2,2-dimethylolheptanoic acid, and 2,2-dimethyloloctanoic acid.

Examples of the basic compound which can be used for neutralizing the anionic group include organic amines such as ammonia, triethyl amine, pyridine, and morpholine; alkanol amines such as monoethanolamine; and metallic base compounds containing, for example, Na, K, Li, or Ca.

Next, a method for obtaining a self-emulsifying urethane resin particles having anionic group is as follows.

First, in the absence of a solvent or in the presence of an organic solvent, an isocyanate-terminated urethane prepolymer is produced by reacting a polymer polyol, a short chain polyhydric alcohol, a polyhydric alcohol having an anionic group and a polyisocyanate. Then, anionic groups in the isocyanate-terminated urethane prepolymer are optionally neutralized with the neutralizing agent and allowed to react with a chain extender such as polyamine, and, finally, the organic solvent in the system is optionally removed, to obtain the urethane resin particles.

Examples of the organic solvent include ketones such as acetone and methyl ethyl ketone; ethers such as tetrahydrofuran and dioxane; acetic acid esters such as ethyl acetate and butyl acetate; nitriles such as acetonitrile; and amides such as dimethyl formamide, N-methylpyrrolidone, and 1-ethyl-2-pyrrolidone.

Examples of the polymer polyol include polycarbonate polyol, polyether polyol and polyester polyol. One of these polymer polyols may be used alone or two or more of these polymer polyols may be used in combination.

Examples of the short chain polyhydric alcohol include polyhydric alcohols having 2 to 15 carbon atoms such as ethylene glycol, propylene glycol, 1,4-butanediol, 1,5-pentanediol, neopentyl glycol, 1,6-hexanediol, 1,8-octanediol, 1,4-cyclohexanedimethanol, diethylene glycol, glycerin and trimethylolpropane.

Examples of the polyisocyanate include aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m-isocyanatophenylsulfonyl isocyanate, and p-isocyanatophenylsulfonyl isocyanate; aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate; and alicyclic polyisocyanate compounds such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate, and 2,6-norbornane diisocyanate. One of these polyisocyanates may be used alone or two or more of these polyisocyanates may be used in combination. Aliphatic polyisocyanate compounds and alicyclic polyisocyanates are preferable among these polyisocyanates, alicyclic polyisocyanates are more preferable, isophorone diisocyanate and 4,4'-dicyclohexylmethane diisocyanate are furthermore preferable.

Examples of the polyamines include diamines such as ethylene diamine, 1,2-propane diamine, 1,6-hexamethylenediamine, piperazine, 2,5-dimethyl piperazine, isophoronediamine, 4,4'-dicyclohexylmethane diamine, and 1,4-cyclohexane diamine; polyamines such as diethylenetriamine, dipropylene triamine, and triethylene tetramine; hydrazines such as hydrazine, N,N'-dimethyl hydrazine, 1,6-hexamethylene bishydrazine; and dihydrazides such as succinic dihydrazide, adipic dihydrazide, glutaric dihydrazide, sebacic dihydrazide, and isophthalic dihydrazide.

A glass transition temperature (Tg) of the urethane resin particle is preferably −45° C. or more, more preferably −40° C. or more, and furthermore preferably −30° C. or more. The glass transition temperature (Tg) of the urethane resin particle is preferably 50° C. or less, more preferably 30° C. or less, and furthermore preferably 28° C. or less. When the glass transition temperature (Tg) of the urethane resin particle is −45° C. or more, heat resistance of the resin is improved and swelling of the resin by the solvent is suppressed, so that storage stability and image hardness are improved. When the glass transition temperature (Tg) of the urethane resin particle is 50° C. or less, the resin dissolves during fixing, so that abrasion resistance is improved.

Resin particles other than the urethane resin particles are not particularly limited and may be appropriately selected depending on the intended purpose. Examples of such resin particles include polyester resin particles, acrylic-based resin particles, vinyl acetate-based resin particles, styrene-based resin particles, butadiene-based resin particles, styrene-butadiene-based resin particles, vinyl chloride-based resin particles, acrylic styrene-based resin particles, and acrylic silicone-based resin particles.

The volume average particle diameter of the resin particles is not particularly limited and can be suitably selected to suit to a particular application. Preferably, the volume average particle diameter is in the range of from 10 to 1,000 nm, more preferably from 10 to 200 nm, and most preferably from 10 to 100 nm, to obtain good fixability and high image hardness. The volume average particle diameter of the resin particles can be measured with a particle size distribution analyzer (NANOTRAC WAVE-UT151 available from MicrotracBEL Corp.).

Preferably, the content rate of the resin in the ink is in the range of from 1% to 30% by mass, more preferably from 5% to 20% by mass, for fixability and storage stability of the ink.

Preferably, solid contents in the ink have a maximum frequency particle diameter in the range of from 20 to 1,000 nm, more preferably from 20 to 150 nm, based on the number of solid contents, for improving discharge stability and image quality (e.g., image density) of the ink. The solid contents include the resin particles and pigment particles. The particle diameter of the solid contents can be measured with a particle size distribution analyzer (NANOTRAC WAVE-UT151 available from MicrotracBEL Corp.).

Additives

The ink may further contain a surfactant, a defoamer, a preservative, a fungicide, a corrosion inhibitor, and/or a pH adjuster, if necessary.

Surfactant

Usable surfactants include silicone-based surfactants, fluorine-based surfactants, ampholytic surfactants, nonionic surfactants, and anionic surfactants.

The silicone-based surfactants have no specific limit and can be suitably selected to suit a particular application. Preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain.

These compounds have weak foaming property, which is preferable. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

These surfactants are available either synthetically or commercially. Commercial products are readily available from BYK Japan KK, Shin-Etsu Chemical Co., Ltd., Dow Corning Toray Co., Ltd., Nihon Emulsion Co., Ltd., and Kyoeisha Chemical Co., Ltd.

Specific examples of the polyether-modified silicone-based surfactants include, but are not limited to, a compound represented by the following formula (S-1) that is a dimethylpolysiloxane having a polyalkylene oxide structure on its side chain bonded to Si atom.

Formula (S-1)

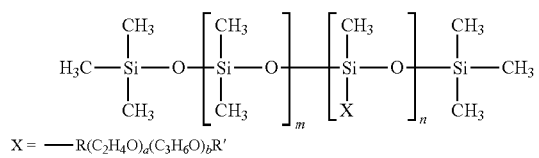

In the formula (S-1), each of m, n, a, and b independently represents an integer, R represents an alkylene group, and R' represents an alkyl group.

Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain. Among these fluorine-based surfactants, polyoxyalkylene ether polymer compounds having a perfluoroalkyl ether group on its side chain are preferable since foaming property thereof is small. More specifically, compounds represented by the following formula (F-1) and (F-2) are preferable.

In the formula (F-1), m is preferably an integer ranging from 0 to 10, and n is preferably an integer ranging from 0 to 40, to give water-solubility to the compound.

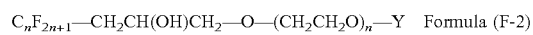

In the formula (F-2), Y represents H, $C_nF_{2n+1}$ (where n represents an integer of from 1 to 6), $CH_2CH(OH)CH_2$—$C_nF_{2n+1}$ (where n represents an integer of from 4 to 6), or $C_pF_{2p+1}$ (where p represents an integer of from 1 to 19); and a represents an integer of from 4 to 14.

The fluorine-based surfactants are available either synthetically or commercially. Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from Sumitomo 3M Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.). Among these, for improving printing quality, in particular color developing property, paper permeability, paper wettability, and uniform dying property, FS-3100, FS-34, and FS-300 (available from The Chemours Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

Preferably, the content rate of the surfactant in the ink is in the range of from 0.001% to 5% by mass, more preferably from 0.05% to 5% by mass, for improving wettability, discharge stability, and image quality.

Defoamer

Specific examples of the defoamer include, but are not limited to, silicone defoamers, polyether defoamers, and fatty acid ester defoamers. Two or more of these defoamers can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster has no particular limit so long as it is capable of adjusting the pH to 7 or higher. Specific examples of such a pH adjuster include, but are not limited to, amines such as diethanolamine and triethanolamine.

Properties of Ink

The properties of the ink, such as viscosity, surface tension, and pH, are not particularly limited and can be suitably selected to suit to a particular application.

Preferably, the ink has a viscosity at 25° C. in the range of from 5 to 30 mPa·s, more preferably from 5 to 25 mPa·s, for improving print density and text quality and obtaining good dischargeability. The viscosity can be measured at 25° C. by a rotatory viscometer (RE-80L available from Toki Sangyo Co., Ltd.) equipped with a standard cone rotor (1° 34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, for preventing corrosion of metal materials contacting the ink.

Preferably, the ink satisfies the following formula:

$$10(a)<(b)<1000(a).$$

In the formula, (a) represents a viscosity of the ink and (b) represents a viscosity of a mixture prepared by mixing the ink and a solvent having the largest mass proportion in the organic solvent having the solubility parameter of from 8.0 to 13.0 at a mass ratio of 1.0:1.0. When (b) is more than 10(a), aggregation of the coloring material caused by vaporization of a liquid component such as water is improved, and image density is improved. When (b) is less than 1000(a), the aggregation of the coloring material in the ink before the image is formed is suppressed, and storage stability and ejection stability are improved. In addition, when the glass transition temperature (Tg) of the urethane resin particle included in the ink is −10° C. or more, it is easy to satisfy 10(a)<(b). When the glass transition temperature (Tg) of the urethane resin particle included in the ink is 0° C. or more, it is easier to satisfy 10(a)<(b). When the total content of the sodium ion, the calcium ion, and the potassium ion included in the ink is 7000 mg/L or less, it is easy to satisfy (b)<1000(a). When the total content of the sodium ion, the calcium ion, and the potassium ion included in the ink is 6500 mg/L or less, it is easier to satisfy (b)<1000(a).

Recording Medium

Specific examples of the recording medium include, but are not limited to, plain paper, glossy paper, special paper, clothes, film, overhead projector (OHP) transparency, and general-purpose printing paper.

Preferably, the ink satisfies the following formula:

$$0.05<(\beta)<1.10.$$

In the formula, (β) represents a slope of an absorption amount (mL/m$^2$) of the ink to the recording medium against a square root of a contact time (ms$^{1/2}$) between the ink and the recording medium, when measured by a dynamic scanning absorptometer. When (β) is more than 0.05, it is possible to suppress an amount of the ink absorbed in the recording medium from excessively reducing, and drying property is improved. When (β) is less than 1.10, it is possible to suppress the amount of the ink absorbed in the recording medium from excessively increasing, an amount of the coloring material remaining on a surface of the recording medium is increased, and image density is improved. The recording medium which easily satisfies 0.05<(β)<1.10 when the ink is used includes MyPaper (manufactured by Ricoh Company, Ltd.), Type 6000 (manufactured by Ricoh Company, Ltd.). These are called plain paper and do not have a coat layer and are relatively easy to absorb the ink. In the present disclosure, the slope is defined as (a) when MyPaper (manufactured by Ricoh Company, Ltd.) is used as the recording medium.

Recording Set

The recording set includes the ink and the recording medium. Preferably, the recording set satisfies the following formula:

$$0.05<(\beta)<1.10.$$

In the formula, (β) represents a slope of an absorption amount (mL/m$^2$) of the ink to the recording medium against a square root of a contact time (ms$^{1/2}$) between the ink and the recording medium, when measured by a dynamic scanning absorptometer. When (0) is more than 0.05, it is possible to suppress an amount of the ink absorbed in the recording medium from excessively reducing, and drying property is improved. When (1) is less than 1.10, it is possible to suppress the amount of the ink absorbed in the recording medium from excessively increasing, an amount of the coloring material remaining on a surface of the recording medium is increased, and image density is improved.

Recorded Matter

The recorded matter according to an embodiment of the present invention includes the recording medium and an image formed with the ink on the recording medium.

The recorded matter may be manufactured by an inkjet recording device and an inkjet recording method.

Recording Device and Recording Method

The ink according to an embodiment of the present invention can be suitably applied to various recording devices employing an inkjet recording method, such as printers, facsimile machines, photocopiers, multifunction peripherals (having the functions of printer, facsimile machine, and photocopier), and three-dimensional objects manufacturing devices.

In the present disclosure, the recording device and the recording method respectively represent a device capable of discharging inks or various treatment liquids to a recording medium and a method for recording an image on the recording medium using the device. The recording medium refers to an article to which the inks or the various treatment liquids can be attached at least temporarily.

The recording device may further optionally include devices relating to feeding, conveying, and ejecting of the recording medium and other devices referred to as a pretreatment device or an aftertreatment device, in addition to the ink discharger.

The recording device may further optionally include a heater for use in the heating process and a drier for use in the drying process. Examples of the heater and the drier include devices for heating and drying the printed surface and the reverse surface of a recording medium. Specific examples of the heater and the drier include, but are not limited to, a fan heater and an infrared heater. The heating process and the drying process may be performed either before, during, or after printing.

In addition, the recording device and the recording method are not limited to those producing merely meaningful visible images such as texts and figures with the ink. For example, the recording device and the recording method can produce patterns like geometric design and 3D images.

The recording device includes both a serial type device in which the discharge head is caused to move and a line type device in which the discharge head is not moved.

Furthermore, in addition to the desktop type, the recording device includes a device capable of printing images on a large recording medium with A0 size and a continuous printer capable of using continuous paper reeled up in a roll form as recording media.

Figure 2:
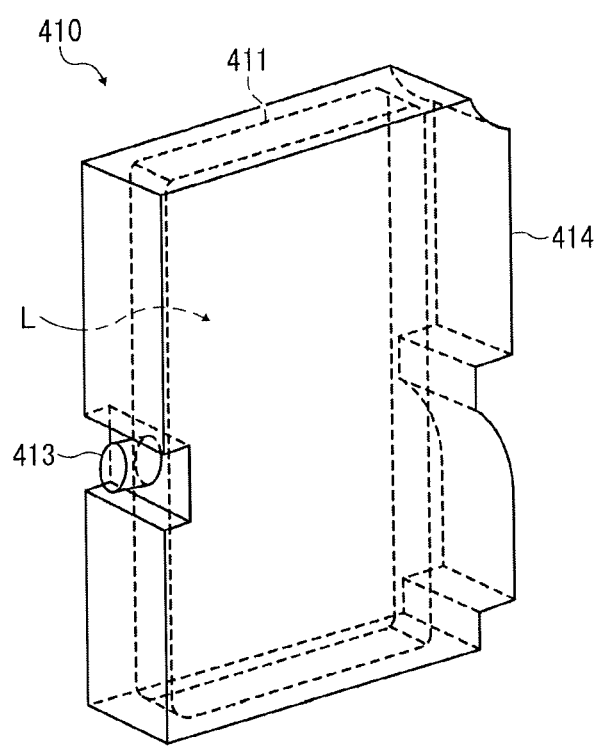
FIG. 2 is a perspective view illustrating a diagram of an example of the ink container.

As one example of the recording device according to an embodiment of the present invention, an image forming apparatus 400 is described in detail below with reference to FIG. 1 and FIG. 2. FIG. 1 is a perspective view of an image forming apparatus 400. FIG. 2 is a perspective view of a main tank for use in the image forming apparatus 400. The image forming apparatus 400 is a serial-type image forming apparatus. A mechanical unit 420 is disposed in a housing 401 of the image forming apparatus 400. Main tanks 410k, 410c, 410m, and 410y for respective color of black (K), cyan (C), magenta (M), and yellow (Y) (hereinafter collectively referred to as "main tank 410") each include an ink container 411. Each ink container 411 is made of a packaging member such as an aluminum laminate film. The ink container 411 is accommodated in a container casing 414 made of plastic. As a result, the main tank 410 is used as an ink cartridge of each color.

A cartridge holder 404 is disposed on the rear side of the opening when a cover 401c is opened. The main tank 410 is detachably attachable to the cartridge holder 404. As a result, each ink discharging outlet 413 of the main tank 410 communicates with a discharge head 434 for each color via a supplying tube 436 for each color so that the ink can be discharged from the discharge head 434 to a recording medium.

The recording device according to an embodiment of the present invention may further optionally include a pretreatment device and/or an aftertreatment device, in addition to the ink discharger.

As an example, the pretreatment device and the aftertreatment device may be provided as a liquid discharger including a liquid container containing the pretreatment or aftertreatment liquid and a liquid discharge head to discharge the pretreatment or aftertreatment liquid by inkjet recording method, having a similar configuration to the liquid discharger for each of the black (K), cyan (C), magenta (M), and yellow (Y) inks.

As another example, the pretreatment device and the aftertreatment device may be provided as a device employing a method other than an inkjet recording method, such as blade coating, roll coating, or spray coating.

The ink may be applied not only to inkjet recording method but also to other methods in various fields. Specific examples of such methods other than an inkjet recording method include, but are not limited to, blade coating methods, gravure coating methods, bar coating methods, roll coating methods, dip coating methods, curtain coating methods, slide coating methods, die coating methods, and spray coating methods.

EXAMPLES

Next, the present disclosure is described in detail with reference to Examples and Comparative Examples but not limited thereto.

Preparation of Urethane Resin Particle 1

100 g of polycarbonate diol (Duranol T5651, manufactured by Asahi Kasei Chemicals Corporation), 6 g of 2,2-bis (hydroxymethyl) propionic acid, 10 g of triethylamine, and 100 g of acetone were placed in a flask equipped with a stirrer, a thermometer, and a reflux condenser and stirred. Further, 50 g of isophorone diisocyanate (IPDI) and three drops of Tin(II) bis(2-ethylhexanoate) were added and heated at 80° C. for 5 hours for reaction. After cooling to 40° C., 400 g of ion-exchanged water was added to the mixture stirred at 300 rpm. Next, isophoronediamine as a chain extender was weighed so that [number of equivalents of chain extender×mass of solid content of prepolymer solution/number of NCO equivalents of prepolymer] was 1.0, and the weighed isophoronediamine was added to the mixture as acetone solution containing 10% isophoronediamine, and the mixture was stirred for 5 hours for chain extension reaction. After removal of acetone using an evaporator, the mixture was diluted with water so that the concentration of the solid content was 30% by mass, and the urethane resin particle 1 was obtained. A glass transition temperature (Tg) of the urethane resin particle 1 was measured as follows and the result is shown in Table 3.

Measurement of Glass Transition Temperature (Tg)

5 mg of sample was placed in a simple sealed pan T-Zero (from TA Instruments Inc.) and the glass transition temperature was measured using DSC (Q 2000, manufactured by TA Instruments Inc.). The measurement was performed under nitrogen gas flow. As 1st heating, the sample was heated from 10° C. to 150° C. at a heating rate of 10° C./min, maintained for 5 minutes, cooled to −50° C. at a cooling rate of 10° C./min, and maintained for 5 minutes. As 2nd heating, the sample was heated at a heating rate of 10° C./min to observe thermal change. A graph showing a relation between the amount of heat generation or absorption and the temperature was drawn, and the glass transition temperature was obtained according to a usual method. The glass transition temperature was obtained by using a midpoint method to the DSC curve of 1st heating.

Preparation of Urethane Resin Particle 2

100 g of polycarbonate diol (Duranol T4672, manufactured by Asahi Kasei Chemicals Corporation), 5 g of 2,2-bis (hydroxymethyl) propionic acid, 10 g of triethylamine, and 100 g of acetone were placed in a flask equipped with a stirrer, a thermometer, and a reflux condenser and stirred. Further, 50 g of isophorone diisocyanate (IPDI) and three drops of Tin(II) bis(2-ethylhexanoate) were added and heated at 80° C. for 5 hours for reaction. After cooling to 40° C., 400 g of ion-exchanged water was added to the mixture stirred at 300 rpm. Next, isophoronediamine as a chain extender was weighed so that [number of equivalents of chain extender×mass of solid content of prepolymer solution/number of NCO equivalents of prepolymer] was 1.0, and the weighed isophoronediamine was added to the mixture as acetone solution containing 10% isophoronediamine, and the mixture was stirred for 5 hours for chain extension reaction. After removal of acetone using an evaporator, the mixture was diluted with water so that the concentration of the solid content was 30% by mass, and the urethane resin particle 2 was obtained. A glass transition temperature (Tg) of the urethane resin particle 2 was measured in the same manner as urethane resin particle 1 and the result is shown in Table 3.

Preparation of Urethane Resin Particle 3

100 g of polycarbonate diol (Duranol T4671, manufactured by Asahi Kasei Chemicals Corporation), 5 g of 2,2-bis(hydroxymethyl) propionic acid, 10 g of triethylamine, and 100 g of acetone were placed in a flask equipped with a stirrer, a thermometer, and a reflux condenser and stirred. Further, 25 g of isophorone diisocyanate (IPDI) and three drops of Tin(II) bis(2-ethylhexanoate) were added and heated at 80° C. for 5 hours for reaction. After cooling to 40° C., 400 g of ion-exchanged water was added to the mixture stirred at 300 rpm. Next, isophoronediamine as a chain extender was weighed so that [number of equivalents of chain extender×mass of solid content of prepolymer solution/number of NCO equivalents of prepolymer] was 1.0, and the weighed isophoronediamine was added to the mixture as acetone solution containing 10% isophoronediamine, and the mixture was stirred for 5 hours for chain extension reaction. After removal of acetone using an evaporator, the mixture was diluted with water so that the concentration of the solid content was 30% by mass, and the urethane resin particle 3 was obtained. A glass transition temperature (Tg) of the urethane resin particle 3 was measured in the same manner as urethane resin particle 1 and the result is shown in Table 3.

Preparation of Urethane Resin Particle 4

100 g of polycarbonate diol (Duranol G3452, manufactured by Asahi Kasei Chemicals Corporation), 5 g of 2,2-bis (hydroxymethyl) propionic acid, 10 g of triethylamine, and 100 g of acetone were placed in a flask equipped with a stirrer, a thermometer, and a reflux condenser and stirred. Further, 25 g of isophorone diisocyanate (IPDI) and three drops of Tin(II) bis(2-ethylhexanoate) were added and heated at 80° C. for 5 hours for reaction. After cooling to 40° C., 400 g of ion-exchanged water was added to the mixture stirred at 300 rpm. Next, isophoronediamine as a chain extender was weighed so that [number of equivalents of chain extender×mass of solid content of prepolymer solution/number of NCO equivalents of prepolymer] was 1.0, and the weighed isophoronediamine was added to the mixture as acetone solution containing 10% isophoronediamine, and the mixture was stirred for 5 hours for chain extension reaction. After removal of acetone using an evaporator, the mixture was diluted with water so that the concentration of the solid content was 30% by mass, and the urethane resin particle 4 was obtained. A glass transition temperature (Tg) of the urethane resin particle 4 was measured in the same manner as urethane resin particle 1 and the result is shown in Table 3.

Preparation of Urethane Resin Particle 5

100 g of polycarbonate diol (Duranol T4691, manufactured by Asahi Kasei Chemicals Corporation), 5 g of 2,2-bis (hydroxymethyl) propionic acid, 10 g of triethylamine, and 100 g of acetone were placed in a flask equipped with a stirrer, a thermometer, and a reflux condenser and stirred. Further, 50 g of isophorone diisocyanate (IPDI) and three drops of Tin(II) bis(2-ethylhexanoate) were added and heated at 80° C. for 5 hours for reaction. After cooling to 40° C., 400 g of ion-exchanged water was added to the mixture stirred at 300 rpm. Next, isophoronediamine as a chain extender was weighed so that [number of equivalents of chain extender×mass of solid content of prepolymer solution/number of NCO equivalents of prepolymer] was 1.0, and the weighed isophoronediamine was added to the mixture as acetone solution containing 10% isophoronediamine, and the mixture was stirred for 5 hours for chain extension reaction. After removal of acetone using an evaporator, the mixture was diluted with water so that the concentration of the solid content was 30% by mass, and the urethane resin particle 5 was obtained. A glass transition temperature (Tg) of the urethane resin particle 5 was measured in the same manner as urethane resin particle 1 and the result is shown in Table 3.

Preparation of Urethane Resin Particle 6

100 g of polycarbonate diol (Duranol T5652, manufactured by Asahi Kasei Chemicals Corporation), 5 g of 2,2-bis (hydroxymethyl) propionic acid, 10 g of triethylamine, and 100 g of acetone were placed in a flask equipped with a stirrer, a thermometer, and a reflux condenser and stirred. Further, 25 g of isophorone diisocyanate (IPDI) and three drops of Tin(II) bis(2-ethylhexanoate) were added and heated at 80° C. for 5 hours for reaction. After cooling to 40° C., 400 g of ion-exchanged water was added to the mixture stirred at 300 rpm. Next, isophoronediamine as a chain extender was weighed so that [number of equivalents of chain extender×mass of solid content of prepolymer solution/number of NCO equivalents of prepolymer] was 1.0, and the weighed isophoronediamine was added to the mixture as acetone solution containing 10% isophoronediamine, and the mixture was stirred for 5 hours for chain extension reaction. After removal of acetone using an evaporator, the mixture was diluted with water so that the concentration of the solid content was 30% by mass, and the urethane resin particle 6 was obtained. A glass transition temperature (Tg) of the urethane resin particle 6 was measured in the same manner as urethane resin particle 1 and the result is shown in Table 3.

TABLE 3

| Urethane resin particle | Glass transition temperature (Tg) |
| --- | --- |
| 1 | 15° C. |
| 2 | 0° C. |
| 3 | 28° C. |
| 4 | −30° C. |
| 5 | 50° C. |
| 6 | −45° C. |

Preparation of Pigment Dispersion 1

A sodium ion as a counter ion of a pigment dispersion (CAB-O-JET-200, manufactured by Cabot Corporation) was substituted with a potassium ion by an ion exchange method, and the pigment dispersion 1 was obtained. Ion exchange by the ion exchange method was performed by charging CAB-O-JET-200 and potassium chloride into a column filled with a cation exchange resin (Gel type diamond SK 110, manufactured by Mitsubishi Chemical Corporation).

Preparation of Pigment Dispersion 2

5 g of concentrated hydrochloric acid was added to 5.3 g of water, and 1.50 g of anthranilic acid was added to the solution at 5° C. This was stirred in an ice bath and maintained constantly at 10° C. or less, and solution at 5° C. obtained by adding 1.75 g of sodium nitrite to 8.7 g of water was added. After stirring for 15 minutes, 7 g of carbon black having a surface area of 220 m$^2$/g and DBP oil absorption of 105 mL/100 g was added while mixing. Thereafter, the mixture was further stirred for 15 minutes. The obtained slurry was filtered with filter paper (Toyo roshi No. 2, manufactured by Advantis Corporation), the pigment particles were thoroughly washed with water and dried in an oven at 110° C., water was added to the obtained pigment 2, and the aqueous pigment solution 2 having a pigment concentration of 15% by mass was obtained.

Next, 30% by mass of pigment 2, 15% by mass of Polyoxyethylene oleic ether ammonium sulfate (Alscope A-225B, manufactured by Toho Chemical Industry Co., Ltd.), 30% by mass of ethylene glycol and the remaining amount of pure water were mixed. The mixture was dispersed using a wet sand mill for 24 hours, centrifuged at 5000 rpm for 1 hour to remove coarse particles, and the pigment dispersion 2 was obtained.

Preparation of Pigment Dispersion 3

The pigment dispersion 3 was obtained in the same manner as in the pigment dispersion 2, except that copper phthalocyanine (Pigment Blue 15:3, manufactured by Dainichiseika Color & Chemicals Mfg. Co., Ltd.) was used instead of carbon black.

Preparation of Ink

Example 1

35% by mass of pigment dispersion (CAB-O-JET-200, manufactured by Cabot Corporation), 10% by mass of urethane resin particle 1, 5.0% by mass of triethylene glycol monomethyl ether, 7.0% by mass of 1,2-hexanediol, 16.0% by mass of propylene glycol, 0.1% by mass of Proxel LV (antiseptic and antifungal agent, manufactured by Avecia), 2% by mass of Saffinol 104 (surfactant, manufactured by Nissin Chemical Industry Co., Ltd.), and remaining amount of pure water were mixed, the mixture was filtered through a membrane filter having an average pore diameter of 0.8 µm, and the ink of Example 1 was obtained.

In addition, the content of the urethane resin particle represents the amount of solid content, and the content of the pigment dispersion represents the total amount of the dispersion.

Examples 2-18 and Comparative Examples 1-6

Each ink was prepared in the same manner as in Example 1 except that the composition and content (% by mass) of Example 1 were changed to those shown in Tables 4 to 6.

Measurement of Metal Ion Content

Samples for making calibration curves of the metal ions (sodium ion, calcium ion, and potassium ion) were prepared. Samples were measured under the following conditions using an ICP emission spectroscopic analyzer (ICPE-9000, manufactured by Shimadzu Corporation), and calibration curves were prepared from the measurement results.

High frequency power: 1.20 (kW)
Plasma gas: 16.0 (L/min)
Auxiliary gas: 1.20 (L/min)
Carrier gas: 0.70 (L/min)
Exposure time: 5 (sec)

Next, each ink was diluted with distilled water, and the diluent was measured in the same manner as in the measurement of the calibration curve samples. From the calibration curves and measurement results, the content of the metal ions in the ink was calculated. The results are shown in Tables 4 to 6.

Measurement of Viscosity

The viscosity (a) of each ink was measured at 25° C. using a viscometer (TV-25, manufactured by Toki Sangyo Co., Ltd.). The viscosity (a) of each ink was measured using a cone plate (φ 40 mm) at a shear rate in the range of 0.01 (1/s) to 1000 (1/s), and the viscosity (a) of the ink is the viscosity when the shear rate is 10 (1/s). The results are shown in Tables 4 to 6.

The viscosity (b) of a mixture described above is measured as follows. The mixture was prepared by mixing 3.0 g of the ink and 3.0 g of a solvent having the largest mass proportion in an organic solvent having a solubility parameter of from 8.0 to 13.0. 1 g of the mixture was used and the viscosity (b) of the mixture was measured in the same manner as the measurement of the viscosity (a). The results are shown in Tables 4 to 6.

Measurement of Ink Absorption Amount to Recording Medium

The ink absorption amount to a My Paper (manufactured by Ricoh Company) was measured with a dynamic scanning absorptometer (KM 500win type, manufactured by Kumagai Riki Kogyo Co., Ltd.). The measurement conditions were as follows. The absorption amount (mL/m$^2$) of the ink to the My Paper and square root of a contact time (ms$^{1/2}$) between the ink and the My Paper were plotted, and a slope (a) of the absorption amount (mL/m$^2$) against the square root of the contact time (ms$^{1/2}$) was obtained. To calculate the slope (α), a spreadsheet software (EXCEL, manufactured by Microsoft Corporation) was used, and the slope (α) was obtained by linear least squares approximation. When the R-squared value was less than 0.7, data was sequentially deleted from the smaller value of square root of the contact time, and the slope (a) was obtained within the range where the R-squared value was 0.7 or more. The results are shown in Tables 4 to 6.

Slit Span (mm): 1
Slit Width (mm): 5
Pitch (mm): 7
Length Per Sampling (degree): 480.80091
Start Radius (mm): 20.000000
End Radius (mm): 100.000000
Min Contact Time (ms): 2.000000
Max Contact Time (ms): 400.000000
Sampling Pattern (1-50): 50.000000
Number of Sampling Points (>0): 7.000000

TABLE 4

| | | Example | | | | | | | | |
|---|---|---|---|---|---|---|---|---|---|---|
| | | 1 | 2 | 3 | 4 | 5 | 6 | 7 | 8 | 9 |
| Pigment dispersion | CAB-O-JET-200 | 35.0 | 35.0 | 35.0 | 35.0 | 35.0 | 40.0 | | | 35.0 |
| | CAB-O-JET-250 | | | | | | | | 35.0 | |
| | CAB-O-JET-300 | | | | | | | 35.0 | | |
| | Pigment dispersion 1 | | | | | | | | | |
| | Pigment dispersion 2 | | | | | | | | | |
| | Pigment dispersion 3 | | | | | | | | | |

TABLE 4-continued

| | | Example | | | | | | | | |
|---|---|---|---|---|---|---|---|---|---|---|
| | | 1 | 2 | 3 | 4 | 5 | 6 | 7 | 8 | 9 |
| Resin particle | Urethane resin particle 1 | 10.0 | 10.0 | 10.0 | 10.0 | 10.0 | 10.0 | 10.0 | 10.0 | |
| | Urethane resin particle 2 | | | | | | | | | 10.0 |
| | Urethane resin particle 3 | | | | | | | | | |
| | Urethane resin particle 4 | | | | | | | | | |
| | Urethane resin particle 5 | | | | | | | | | |
| | Urethane resin particle 6 | | | | | | | | | |
| Organic solvent (SP value) | Triethylene glycol dimethyl ether (8.4) | | | | | 6.0 | | | | |
| | 2-Ethyl-1,3-hexanediol (9.9) | | | | 4.0 | | | | | |
| | Triethylene glycol monomethyl ether (10.1) | 5.0 | 8.0 | 10.0 | | | 3.0 | 5.0 | 5.0 | 5.0 |
| | 2-pyrrolidone (11.1) | | | | 4.0 | | | | | |
| | 1,2-hexanediol (11.8) | 7.0 | 12.0 | 16.0 | | 8.0 | 7.0 | 7.0 | 7.0 | 7.0 |
| | 1,3-butanediol (12.8) | | | | 16.0 | | | | | |
| | Propylene glycol (13.5) | 16.0 | 8.0 | | | | 14.0 | 16.0 | 16.0 | 16.0 |
| | 1,3-propanediol (13.7) | | | | 16.0 | | | | | |
| Preservative and fungicide | Proxel LV | 0.1 | 0.1 | 0.1 | 0.1 | 0.1 | 0.1 | 0.1 | 0.1 | 0.1 |
| Surfactant | Surfynol 104 | 2.0 | 2.0 | 2.0 | 2.0 | 2.0 | 2.0 | 2.0 | 2.0 | 2.0 |
| Pure water | | Rest | Rest | Rest | Rest | Rest | Rest | Rest | Rest | Rest |
| Total | | 100.0 | 100.0 | 100.0 | 100.0 | 100.0 | 100.0 | 100.0 | 100.0 | 100.0 |
| Content of organic solvent having SP value of 8.0 to 13.0 | | 12.0 | 20.0 | 26.0 | 24.0 | 14.0 | 10.0 | 12.0 | 12.0 | 12.0 |
| Amount of metal ion (Mg/L) | Sodium ion | 5000 | 5000 | 5000 | 5000 | 5000 | 5800 | 7500 | 6500 | 5000 |
| | Calcium ion | 2 | 2 | 2 | 2 | 2 | 3 | 5 | 200 | 2 |
| | Potassium ion | 10 | 10 | 10 | 10 | 10 | 12 | 15 | 8 | 10 |
| Viscosity (MPa·s) | Viscosity (a) | 7 | 8 | 8 | 8 | 8 | 10 | 7 | 6 | 7 |
| | Viscosity (b) | 200 | 2000 | 8000 | 500 | 500 | 6000 | 8000 | 200 | 100 |
| Slope (α) (penetration rate) | | 0.09 | 0.09 | 0.08 | 0.07 | 0.07 | 0.05 | 0.06 | 0.10 | 0.09 |

TABLE 5

| | | Example | | | | | | | | |
|---|---|---|---|---|---|---|---|---|---|---|
| | | 10 | 11 | 12 | 13 | 14 | 15 | 16 | 17 | 18 |
| Pigment dispersion | CAB-O-JET-200 | 35.0 | 35.0 | 35.0 | 35.0 | | 30.0 | 35.0 | | |
| | CAB-O-JET-250 | | | | | | | | | |
| | CAB-O-JET-300 | | | | | | | | | 37.0 |
| | Pigment dispersion 1 | | | | | 35.0 | | | | |
| | Pigment dispersion 2 | | | | | | | | 35.0 | |
| | Pigment dispersion 3 | | | | | | | | | |
| Resin particle | Urethane resin particle 1 | | | | | 10.0 | 15.0 | 5.0 | 10.0 | 10.0 |
| | Urethane resin particle 2 | | | | | | | | | |
| | Urethane resin particle 3 | 10.0 | | | | | | | | |
| | Urethane resin particle 4 | | 10.0 | | | | | | | |
| | Urethane resin particle 5 | | | 10.0 | | | | | | |
| | Urethane resin particle 6 | | | | 10.0 | | | | | |
| Organic solvent (SP value) | Triethylene glycol dimethyl ether (8.4) | | | | | | | | | |
| | 2-Ethyl-1,3-hexanediol (9.9) | | | | | | | | | |
| | Triethylene glycol monomethyl ether (10.1) | 5.0 | 5.0 | 5.0 | 5.0 | 5.0 | 5.0 | 5.0 | 5.0 | 5.0 |
| | 2-pyrrolidone (11.1) | | | | | | | | | |
| | 1,2-hexanediol (11.8) | 7.0 | 7.0 | 7.0 | 7.0 | 7.0 | 7.0 | 7.0 | 7.0 | 7.0 |
| | 1,3-butanediol (12.8) | | | | | | | | | |
| | Propylene glycol (13.5) | 16.0 | 16.0 | 16.0 | 16.0 | 16.0 | 16.0 | 16.0 | 16.0 | 16.0 |
| | 1,3-propanediol (13.7) | | | | | | | | | |
| Preservative and fungicide | Proxel LV | 0.1 | 0.1 | 0.1 | 0.1 | 0.1 | 0.1 | 0.1 | 0.1 | 0.1 |
| Surfactant | Surfynol 104 | 2.0 | 2.0 | 2.0 | 2.0 | 2.0 | 2.0 | 2.0 | 2.0 | 2.0 |
| Pure water | | Rest | Rest | Rest | Rest | Rest | Rest | Rest | Rest | Rest |
| Total | | 100.0 | 100.0 | 100.0 | 100.0 | 100.0 | 100.0 | 100.0 | 100.0 | 100.0 |
| Content of organic solvent having SP value of 8.0 to 13.0 | | 12.0 | 12.0 | 12.0 | 12.0 | 12.0 | 12.0 | 12.0 | 12.0 | 12.0 |
| Amount of metal ion (Mg/L) | Sodium ion | 5000 | 5000 | 5000 | 5000 | 200 | 5000 | 4500 | 4000 | 7900 |
| | Calcium ion | 2 | 2 | 2 | 2 | 2 | 2 | 2 | 5 | 7 |
| | Potassium ion | 10 | 10 | 10 | 10 | 4800 | 10 | 7 | 5 | 16 |

TABLE 5-continued

|  |  | Example | | | | | | | | |
|---|---|---|---|---|---|---|---|---|---|---|
|  |  | 10 | 11 | 12 | 13 | 14 | 15 | 16 | 17 | 18 |
| Viscosity (MPa · s) | Viscosity (a) | 7 | 7 | 7 | 7 | 7 | 9 | 6 | 7 | 8 |
|  | Viscosity (b) | 800 | 50 | 200 | 40 | 210 | 350 | 200 | 100 | 8500 |
| Slope ($\alpha$) (penetration rate) |  | 0.09 | 0.08 | 0.09 | 0.09 | 0.09 | 0.08 | 1.00 | 0.10 | 0.06 |

TABLE 6

|  |  | Comparative example | | | | | |
|---|---|---|---|---|---|---|---|
|  |  | 1 | 2 | 3 | 4 | 5 | 6 |
| Pigment dispersion | CAB-O-JET-200 | 35.0 |  | 35.0 | 35.0 |  |  |
|  | CAB-O-JET-250 |  |  |  |  |  |  |
|  | CAB-O-JET-300 |  | 40.0 |  |  |  |  |
|  | Pigment dispersion 1 |  |  |  |  |  |  |
|  | Pigment dispersion 2 |  |  |  |  | 25.0 |  |
|  | Pigment dispersion 3 |  |  |  |  |  | 25.0 |
| Resin particle | Urethane resin particle 1 |  | 10.0 | 10.0 | 10.0 | 10.0 | 10.0 |
|  | Urethane resin particle 2 |  |  |  |  |  |  |
|  | Urethane resin particle 3 |  |  |  |  |  |  |
|  | Urethane resin particle 4 |  |  |  |  |  |  |
|  | Urethane resin particle 5 |  |  |  |  |  |  |
|  | Urethane resin particle 6 |  |  |  |  |  |  |
| Organic solvent (SP value) | Triethylene glycol dimethyl ether (8.4) |  |  |  |  |  |  |
|  | 2-Ethyl-1,3-hexanediol (9.9) |  |  |  | 8.0 |  |  |
|  | Triethylene glycol monomethyl ether (10.1) | 7.0 | 5.0 |  |  | 5.0 | 5.0 |
|  | 2-pyrrolidone (11.1) |  |  |  | 4.0 |  |  |
|  | 1,2-hexanediol (11.8) | 7.0 | 7.0 | 8.0 |  | 7.0 | 7.0 |
|  | 1,3-butanediol (12.8) |  |  |  | 20.0 |  |  |
|  | Propylene glycol (13.5) | 14.0 | 16.0 | 14.0 |  | 16.0 | 16.0 |
|  | 1,3-propanediol (13.7) |  |  |  | 10.0 |  |  |
| Preservative and fungicide | Proxel LV | 0.1 | 0.1 | 0.1 | 0.1 | 0.1 | 0.1 |
| Surfactant | Surfynol 104 | 2.0 | 2.0 | 2.0 | 2.0 | 2.0 | 2.0 |
| Pure water |  | Rest | Rest | Rest | Rest | Rest | Rest |
| Total |  | 100.0 | 100.0 | 100.0 | 100.0 | 100.0 | 100.0 |
| Content of organic solvent having SP value of 8.0 to 13.0 |  | 14.0 | 12.0 | 8.0 | 32.0 | 12.0 | 12.0 |
| Amount of metal ion (Mg/L) | Sodium ion | 5000 | 8500 | 5000 | 5000 | 3000 | 2500 |
|  | Calcium ion | 2 | 5 | 2 | 2 | 2 | 2 |
|  | Potassium ion | 10 | 21 | 10 | 10 | 10 | 5 |
| Viscosity (MPa · s) | Viscosity (a) | 5 | 10 | 7 | 8 | 7 | 7 |
|  | Viscosity (b) | 35 | 1000 | 10 | 9000 | 5 | 5 |
| Slope ($\alpha$) (penetration rate) |  | 1.00 | 0.06 | 1.21 | 0.08 | 1.23 | 1.25 |

In Tables 4 to 6, the trade names of the used materials and manufacturer names are as follows.

CAB-O-JET-200 (pigment dispersion, manufactured by Cabot Corporation)

CAB-O-JET-250 (pigment dispersion, manufactured by Cabot Corporation)

CAB-O-JET-300 (pigment dispersion, manufactured by Cabot Corporation)

Proxel LV (preservative and fungicide, manufactured by Avecia)

Saffinol 104 (surfactant, manufactured by Nissin Chemical Industry Co., Ltd.)

Evaluation of Storage Stability

A glass container with a capacity of 30 mL with a lid was filled with 15 mL of ink and stored at 70 degrees C. for 3 weeks. The change rate of the viscosity after the storage to the viscosity before the storage was obtained from the following relation and evaluated according to the following criteria. The results are shown in Table 7. The grades A and B are allowable.

Change rate of viscosity (%)=((Viscosity of ink after storage−Viscosity of ink before storage)/(Viscosity of ink before storage))×100

The viscosity was measured by a viscometer (RE80L, manufactured by TOKI SANGYO CO., LTD.) to measure the viscosity of the ink at 25 degrees C. at 50 rotations.

Evaluation Criteria

A: Change rate of viscosity is within + or −5%

B: Change rate of viscosity is within the range of from −10% to less than −5% and more than 5% to 10%

C: Change rate of viscosity is less than −10% or more than 10%

Evaluation of Image Density

Each ink was filled in an ink jet printer (IPSiO GX 5000, manufactured by Ricoh Company, Ltd.) and a monochrome solid image was printed on a My paper (manufactured by Ricoh Company, Ltd.) at 23° C. and 50% RH at a resolution of 600 dpi with a constant discharge amount. Image density was measured with X-Rite 938 (manufactured by X-Rite Co., Ltd.) set to status T mode. The results are shown in Table 7. In the case of black ink, 1.20 or more is allowable. In the case of cyan ink, 1.80 or more is allowable.

Evaluation of Abrasion Resistance

A solid image prepared in the same manner as the solid image prepared for the evaluation of image density was thoroughly dried, and the solid image was rubbed ten times with a cotton cloth using a clock meter (manufactured by Daiiei Scientific Seiki Seisakusho). Transfer of the pigment to the cotton cloth was visually observed and the abrasion resistance was evaluated according to the following criteria. The results are shown in Table 7. The grades A and B are allowable.

Evaluation Criteria
A: Transfer to the cotton cloth was not observed
B: Transfer to the cotton cloth was observed slightly
C: Transfer to the cotton cloth was observed markedly

TABLE 7

| | | Storage stability | Image density | Abrasion resistance |
|---|---|---|---|---|
| Example | 1 | A | 1.25 | B |
| | 2 | A | 1.30 | A |
| | 3 | A | 1.35 | A |
| | 4 | A | 1.25 | A |
| | 5 | A | 1.25 | A |
| | 6 | A | 1.42 | B |
| | 7 | B | 1.40 | A |
| | 8 | A | 2.50 | B |
| | 9 | B | 1.28 | A |
| | 10 | A | 1.25 | A |
| | 11 | A | 1.21 | A |
| | 12 | A | 1.23 | B |
| | 13 | B | 1.21 | B |
| | 14 | A | 1.24 | B |
| | 15 | B | 1.24 | A |
| | 16 | B | 1.26 | B |
| | 17 | A | 1.23 | A |
| | 18 | B | 1.42 | B |
| Comparative example | 1 | A | 1.30 | C |
| | 2 | C | 1.42 | C |
| | 3 | A | 1.10 | A |
| | 4 | C | 1.43 | B |
| | 5 | A | 1.10 | A |
| | 6 | A | 1.70 | A |

What is claimed is:

1. An ink comprising:
    water,
    a coloring material;
    an organic solvent having a solubility parameter of from 8.0 to 13.0;
    an urethane resin particle; and
    a metal ion,
    wherein the organic solvent having the solubility parameter of from 8.0 to 13.0 has a proportion of from 10.0% by mass to 30.0% by mass to the ink,
    wherein the metal ion is at least one selected from a group consisting of an alkali metal ion and an alkaline earth metal ion,
    wherein the metal ion has a proportion of from 4000 mg/L to 8000 mg/L to the ink.
2. The ink of claim 1,
    wherein the metal ion is at least one member selected from a group consisting of a sodium ion, a calcium ion and a potassium ion.
3. The ink of claim 1,
    wherein the ink satisfies the following formula:

$$10(a)<(b)<1000(a)$$

wherein (a) represents a viscosity of the ink and (b) represents a viscosity of a mixture prepared by mixing the ink and a solvent having the largest mass proportion in the organic solvent having the solubility parameter of from 8.0 to 13.0 at a mass ratio of 1.0:1.0.
4. The ink of claim 1,
    wherein the urethane resin particle has a glass transition temperature (Tg) of from −40° C. to 30° C.
5. The ink of claim 1,
    wherein the urethane resin particle is a polycarbonate urethane resin particle.
6. The ink of claim 1,
    wherein the ink satisfies the following formula:

$$0.05<(\alpha)<1.10$$

wherein ($\alpha$) represents a slope of an absorption amount (mL/m$^2$) of the ink to a paper against a square root of a contact time (ms$^{1/2}$) between the ink and the paper, when measured by a dynamic scanning absorptometer.
7. The ink of claim 1,
    wherein the ink comprises a sodium ion,
    wherein the sodium ion has a proportion of from 3000 mg/L to 8000 mg/L to the ink.
8. An ink container comprising:
    the ink of claim 1; and
    an accommodating unit configured to include the ink.
9. A recording device comprising:
    the ink container of claim 8; and
    a discharging device configured to discharge the ink accommodated in the ink container.
10. A recording set comprising:
    the ink of claim 1; and
    a recording medium,
    wherein the ink satisfies the following formula:

$$0.05<(\beta)<0.10$$

wherein ($\beta$) represents a slope of an absorption amount (mL/m$^2$) of the ink to the recording medium against a square root of a contact time (ms$^{1/2}$) between the ink and the recording medium, when measured by a dynamic scanning absorptometer.
11. A recording method comprising:
    discharging the ink of claim 1.

* * * * *